(12) United States Patent
Geisel (10) Patent No.: US 7,175,366 B2
(45) Date of Patent: Feb. 13, 2007

(54) DEVICE, SYSTEM, AND METHOD FOR REMEDIATION OF CONTAMINATED SOIL

(76) Inventor: Donald J. Geisel, 6 Jordan Ct., Clifton Park, NY (US) 12065

( * ) Notice: Subject to any disclaimer, the term of this patent is extended or adjusted under 35 U.S.C. 154(b) by 0 days.

(21) Appl. No.: 11/262,281

(22) Filed: Oct. 28, 2005

(65) Prior Publication Data

US 2006/0112627 A1   Jun. 1, 2006

Related U.S. Application Data

(60) Provisional application No. 60/624,205, filed on Nov. 2, 2004.

(51) Int. Cl.
*B09C 1/06* (2006.01)
(52) U.S. Cl. .................... 405/128.85; 166/57
(58) Field of Classification Search .............. 166/57; 405/128.35, 128.4, 128.85
See application file for complete search history.

(56) References Cited

U.S. PATENT DOCUMENTS

| | | | | |
|---|---|---|---|---|
| 3,467,143 A | * | 9/1969 | Croft | ............. 138/113 |
| 3,853,759 A | * | 12/1974 | Titmas | ............. 210/600 |
| 3,994,341 A | | 11/1976 | Anderson et al. | |
| 4,611,950 A | | 9/1986 | Russomano | |
| 4,842,448 A | | 6/1989 | Koerner et al. | |
| 4,982,788 A | | 1/1991 | Donnelly | |
| 5,011,329 A | | 4/1991 | Nelson et al. | |
| 5,018,576 A | | 5/1991 | Udell et al. | |
| 5,120,160 A | | 6/1992 | Schwengel | |
| 5,181,655 A | | 1/1993 | Bruckelmyer | |
| 5,209,604 A | | 5/1993 | Chou | |
| 5,233,164 A | | 8/1993 | Dicks et al. | |
| 5,244,310 A | | 9/1993 | Johnson | |
| 5,249,888 A | | 10/1993 | Braithwaite et al. | |
| 5,277,518 A | | 1/1994 | Billings et al. | |
| 5,286,140 A | | 2/1994 | Mather | |
| 5,318,116 A | | 6/1994 | Vinegar et al. | |
| 5,330,291 A | | 7/1994 | Heath et al. | |
| 5,435,666 A | | 7/1995 | Hassett et al. | |
| 5,449,113 A | * | 9/1995 | Bruckelmyer | ............. 237/1 R |
| 5,449,251 A | | 9/1995 | Daily et al. | |
| 5,482,402 A | | 1/1996 | Nelson | |
| 5,558,463 A | * | 9/1996 | Geisel | ............. 405/128.55 |

FOREIGN PATENT DOCUMENTS

| | | |
|---|---|---|
| JP | 5-33326 A | 2/1993 |
| SU | 324340 | 11/1972 |
| SU | 1229-256 A1 | 5/1986 |

\* cited by examiner

*Primary Examiner*—John Kreck
(74) *Attorney, Agent, or Firm*—Schmeiser, Olsen & Watts (57) ABSTRACT

A system, method, and devices for remediating soil of an area of land. The devices are partially inserted into the soil within the area. The devices have vent holes fluidically coupling each device to the soil. A hot fluid is circulated through the devices to heat the soil in the area to a temperature sufficient to cause a transformation in the soil. The transformation may transform an environmental contaminant in the soil such that a gas is generated from the transformation, and the gas is sucked from the soil into the devices via the vent holes and the out of the devices away from the soil. The transformation may cause a bioremediation of an environmental contaminant in the soil such that a product is generated from the bioremediation, and a bioremediation fluid is injected into the devices and into the soil via the vent holes to facilitate the bioremediation.

28 Claims, 8 Drawing Sheets

DEVICE, SYSTEM, AND METHOD FOR REMEDIATION OF CONTAMINATED SOIL

RELATED APPLICATION

The present invention claims priority to U.S. Provisional Application No. 60/624,205, filed Nov. 2, 2004 and entitled "Environmental Remediation System Using HeatTrodes" and is incorporated herein by reference in its entirety.

BACKGROUND OF THE INVENTION

1. Technical Field

The present invention relates to a device, system, and method for remediation of contaminated soil.

2. Related Art

Current technologies for remediating contaminated soil employ electrical soil-warming techniques to convert contaminants in the soil to a gas that is ultimately released from the soil. However, there are several recognized drawbacks to existing electrical soil-warming techniques including:

1) Energy Utilization: heating with 6.8 MHz electricity is about twice as expensive a basic 60 Hz power; conversion and utilization of energy in the form of electricity (and especially RF) can be as much as six times the cost of direct, fossil-fired energy use.

2) Startup costs: Use of electrical systems and RF generators typically require complex impedance matching systems and electrical power distribution systems.

3) Radiation: Potentially hazardous RF radiation are a growing national concern; new ANSI standards are becoming increasingly more stringent in this area.

4) High Voltage: Potentially dangerous high voltage is a concern with the use of in-ground electrodes; voltage can be as high as 10 KV in electrical warming systems.

5) Hot Spots: Electrical warming presents the possible problem of hot spots and possible underground fires/explosions caused by dielectric variations in geological structure.

Thus, there is a need for a new technology to remediate contaminated soil that avoids at least one of the preceding drawbacks.

SUMMARY OF THE INVENTION

The present invention provides a soil-remediation device for remediating soil of an area of land, said device comprising:

an outer member that includes an outer surface of the device, wherein the outer member comprises a first thermally conductive material;

a tubular member through which a fluid may be circulated in and out of the device such that if the device is in contact with the soil then heat is transferred from the fluid to the soil by being transferred from the fluid to the tubular member, from the tubular member to the outer member, and from the outer member to the soil, wherein the fluid in the tubular member is at a higher temperature than is the soil in contact with the device, wherein the tubular member comprises a second thermally conductive material, and wherein the outer member surrounds the tubular member;

a plurality of springs within an interior space of the device such that the plurality of springs applies a force to the tubular member to facilitate direct physical and thermal contact between the tubular member and the outer member, wherein the tubular member surrounds the interior space and the plurality of springs; and a plurality of vent holes in the outer member, such that if the device is in contact with the soil then a gas may flow through the vent holes from the soil to the interior space or from the interior space to the soil.

The present invention provides a system for remediating soil of an area of land, said system comprising:

N soil-remediation devices partially inserted into the soil of the area, said N being at least 3, each device of the N devices comprising a plurality of vent holes for fluidically coupling each device of the N devices to the soil;

circulation means for circulating a hot fluid in and out of each device of the N devices to transfer heat from the hot fluid to the soil, the heat passing from a hot fluid supply manifold to the N devices and then to a hot fluid return manifold, the hot fluid in the fluid supply manifold having a higher temperature than the hot fluid in the return manifold, the hot fluid in each device of the N devices having a higher temperature than a temperature of the soil in contact with each device, the heat transferred from the N devices to the soil heating the soil to a temperature sufficient to cause a transformation of an environmental contaminant in the soil such that a gas is generated from the transformation; and suction means for sucking the gas from the soil into M devices of the N devices via the vent holes of the M devices and out of the M devices away from the soil, said M at least 1 and no greater than N.

The present invention provides a system for remediating soil of an area of land, said system comprising N soil-remediation devices partially inserted into the soil of the area, said N being at least 3, each device of the N devices comprising a plurality of vent holes for fluidically coupling each device of the N devices to the soil;

circulation means for circulating a hot fluid in and out of each device of the N devices to transfer heat from the hot fluid to the soil, the heat passing from a fluid supply manifold to the N devices and then to a fluid return manifold, the hot fluid in the fluid supply manifold having a higher temperature than the fluid in the return manifold, the hot fluid in each device of the N devices having a higher temperature than a temperature of the soil in contact with each device, the heat transferred from the N devices to the soil heating the soil to a temperature sufficient to cause a bioremediation of an environmental contaminant in the soil such that a product is generated from the bioremediation; and injection means being means for injecting a bioremediation fluid into M devices of the N devices such that the bioremediation fluid flows from the M devices to the soil via the vent holes of the M devices to facilitate the bioremediation, said M being at least 1 and no greater than N.

The soil remediation technology of the present invention offers advantages of improved simplicity, energy efficiency, and improved safety as compared with current electrically-based soil-warming techniques of the related art.

DETAILED DESCRIPTION OF THE INVENTION

The soil warming approach of the present invention is a direct thermal warming technology, using a network of devices called HeatTrodes. These devices (e.g., tubular devices) are partially inserted into contaminated soil (e.g., punched into the contaminated soil). Warming of the soil is attained by continually circulating hot fluid with good heat transfer properties within the HeatTrodes, which act as conductive, in situ, heat exchangers. No water is transferred from the HeatTrode to the surrounding soil. Any suitable heat transfer fluid may be used as the hot fluid such as, inter alia, water, oil, steam, etc. Heat is transferred from the circulating hot fluid to the soil by conduction through the outer member (e.g., wall) of the HeatTrodes. The heated soil volatilizes contaminants in the soil and the HeatTrode devices extract the volatilized contaminants from the soil. HeatTrodes may be plumbed together in rows or other geometric configurations with flexible tubing using supply manifolds and return manifolds. The supply and return manifolds are connected to a hot fluid source and one or more pumps.

The installation of these HeatTrode devices is economical and rapid when a unit such as a Geoprobe, a hydraulic unit, pre-punches a slight undersize hole to allow for insertion of the element, yet allowing enough force against the soil to make adequate thermal contact, and the same Geoprobe presses the HeatTrode into the soil. Using this punching technique, twenty five 9 foot HeatTrodes can be installed in extremely tight soil in a short day by a 2 man crew. Alternatively, a HeatTrode may be partially inserted into the soil by any other technique known to a person of ordinary skill in the art, such by removing soil (e.g., by drilling) to create a hole, inserting the HeatTrode into the hole, and refilling the hole around the inserted HeatTrode with soil or other porous filler material to hold the HeatTrode in place.

Figure 1:
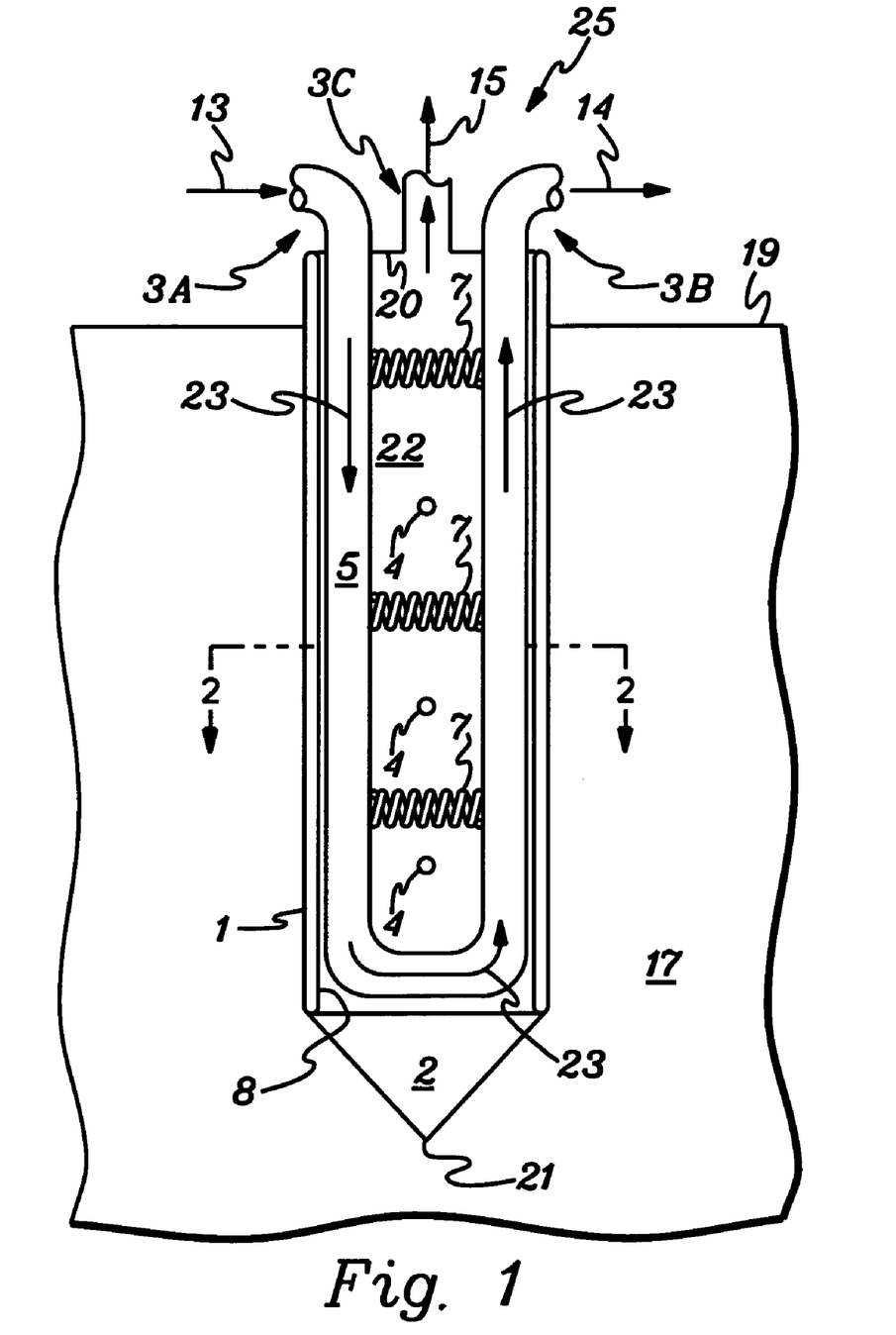
FIG. 1 depicts a soil-remediation device partially inserted into soil of an area of land for remediating the soil in the area with respect to environmental contamination in the soil, in accordance with embodiments of the present invention.

FIG. 1 depicts a HeatTrode device 25 partially inserted into soil 17 (i.e., the Earth's surface) on an area of land for remediating the soil 17 in the area with respect to environmental contamination in the soil, in accordance with embodiments of the present invention. The device 25 partially protrudes above the soil surface 19 of the soil 17. The device 25 comprises an outer member 1, a tubular member 5, a plurality of springs 7, a plurality of vent holes 4, and pointed member 2. A top seal 20 seals an interior space 22 of the device 25 at the top of the device 25.

The outer member 1 may be an outer wall whose outer surface is also an outer surface of the device 25. The outer member 1 comprises a first thermally conductive material (e.g., Schedule 40 one inch pipe or other equivalent material, steel etc.). The outside characteristic dimension (e.g., outside diameter if the HeatTrode geometry is a cylindrical geometry) of the outer member 1 may range, inter alia, from 0.5 to 2 inches.

The tubular member 5 is surrounded by the outer member 1. In one embodiment, the tubular member 5 is a U-tube. A hot fluid 23 flows through the tubular member 5 by flowing into (13) the tubular member 5 at the connector 3A, then to the bottom of the device 25, and then out of (14) the tubular member 5 at the connector 3B, as shown The tubular member 5 comprises a second thermally conductive material (e.g., copper.). The first thermally conductive material of the outer member 1 and the second thermally conductive material of the tubular member 5 may be a same thermally conductive material or a different thermally conductive material.

The tubular member 5 is spring loaded with the springs 7 to facilitate direct physical and thermal contact between the outer wall of the tubular member 5 and the inner wall 8 of the outer member 1. The springs 7 are disposed in the interior space 22 of the device 25. The springs 7 are compression springs that may assume numerous mechanical forms. The tubular member 5 surrounds the springs 7 and the interior space 22. A spatial distribution of the springs 7 at an appropriate spatial density (e.g., 0.5–2 springs per foot) are centered along the inner walls of the tubular member 5 in order to apply a force to the tubular member 5 to facilitate good thermal conduction between the tubular member 5 and the outer member 1. In one embodiment, the plurality of springs 7 comprise at least three springs uniformly spaced apart in an axial direction 6 of the device. In another embodiment, the plurality of springs 7 comprise at least three springs not uniformly spaced apart in said axial direction 6. The springs can be inserted, some springs with the tubular member 5 (into the outer member 1) and remaining springs after using a spring insertion tool. Such a spring-insertion technique is useful because insertion force between the tubular member 5 and outer member 1 may be excessive. Therefore, some springs may be inserted after initial assembly to press the tubular member 5 against the outer member 1.

The hot fluid 23 in the device 25 is at a higher temperature than the temperature of the adjacent soil 17. As a result, heat flows from the hot fluid 23 to the tubular member 5 by convection, from the tubular member 5 to the outer member 1 by conduction, and from the outer member 1 to the soil 17 by conduction. The heat transferred to the soil from the hot fluid 23 heats the soil 17 to a temperature sufficient to cause a transformation of an environmental contaminant in the soil such that a contaminant gas is generated from the transformation. As an example, the environmental contaminant may be a volatile organic compound (VOC) (e.g., benzene, toluene, alcohols (e.g., acetone)), wherein the transformation of the VOC generates the contaminant gas. As another example, the environmental contaminant may be a semi-volatile organic compound (SVOC), wherein the transformation biodegrades the SVOC (e.g., phenol, oil, tars, etc.). As yet another example, the environmental contaminant may be a non-organic compound.

The contaminant gas generated in the soil 17 from said transformation enters the interior space 22 of the device 25 via the vent holes 4 due to a vacuum in the interior space 22 generated by an external pump (see pump 121 in FIG. 3) that pumps gaseous matter (including the contaminant gas 15) out of the device 25 at the connector 3C and away from the soil 17. The vent holes 4 may have any shape and have sufficient flow area to adequately circulate the contaminent gas 15 into and out of the device 25. For example, the vent holes may be circular with a diameter in a range of 1/16 inch to 1/4 inch. In one embodiment, the vent holes 4 may be spaced to favor the lower portion of the device 25 (i.e., at the part of the device 25 that is deepest into the soil 17). In said embodiment, no vent holes are at soil levels in the first 1–2 feet below the soil surface 19, so as to limit "open circuiting" or unwanted air from flowing down along the outer surface of the device 25 from the soil surface 19. The absence of vent holes at soil levels in the first 1–2 feet below the soil surface 19 increases the radius of influence of collection of the gas 15.

The pointed member 2 is on the bottom end of the device 25 and is mechanically connected to the outer member 25. The pointed member 2 has a pointed end 21 that enables the device 25 to be driven into the soil 17 such that the pointed end 21 is driven more deeply into the soil 17 than any other portion of the device 25. In some embodiments the pointed end may be omitted or replaced by an end have a shape that differs from a pointed shape such that the device 25 may be partially inserted into the ground 17 by methods other than by being driven into the ground, as explained supra. The pointed member 2 may comprise any material capable of having its mechanical properties remain stable during a period in which the device 25 stays inserted into the soil 17. Such material of the pointed member 2 may comprise, inter alia, hardened steel.

The device 25 is a heat transfer device in which the hot fluid 23 is heated by a heat source (e.g., boiler) so as to form a closed loop heat distribution system. The hot fluid 23 circulates by forced convection; i.e., driven by an external pump.

The HeatTrodes devices 25 have distinct temperature/time profiles and radii of influence depending on their design and placement in the soil 17. It has been determined that HeatTrodes of 1.3 inch outside diameter (Schedule 40 pipe) that are placed on 5 foot staggered centers such that all are 5 feet from each other perform adequately to warm a soil site in approximately 30 days with a reasonable economic cost of material and fuel.

Figure 2:
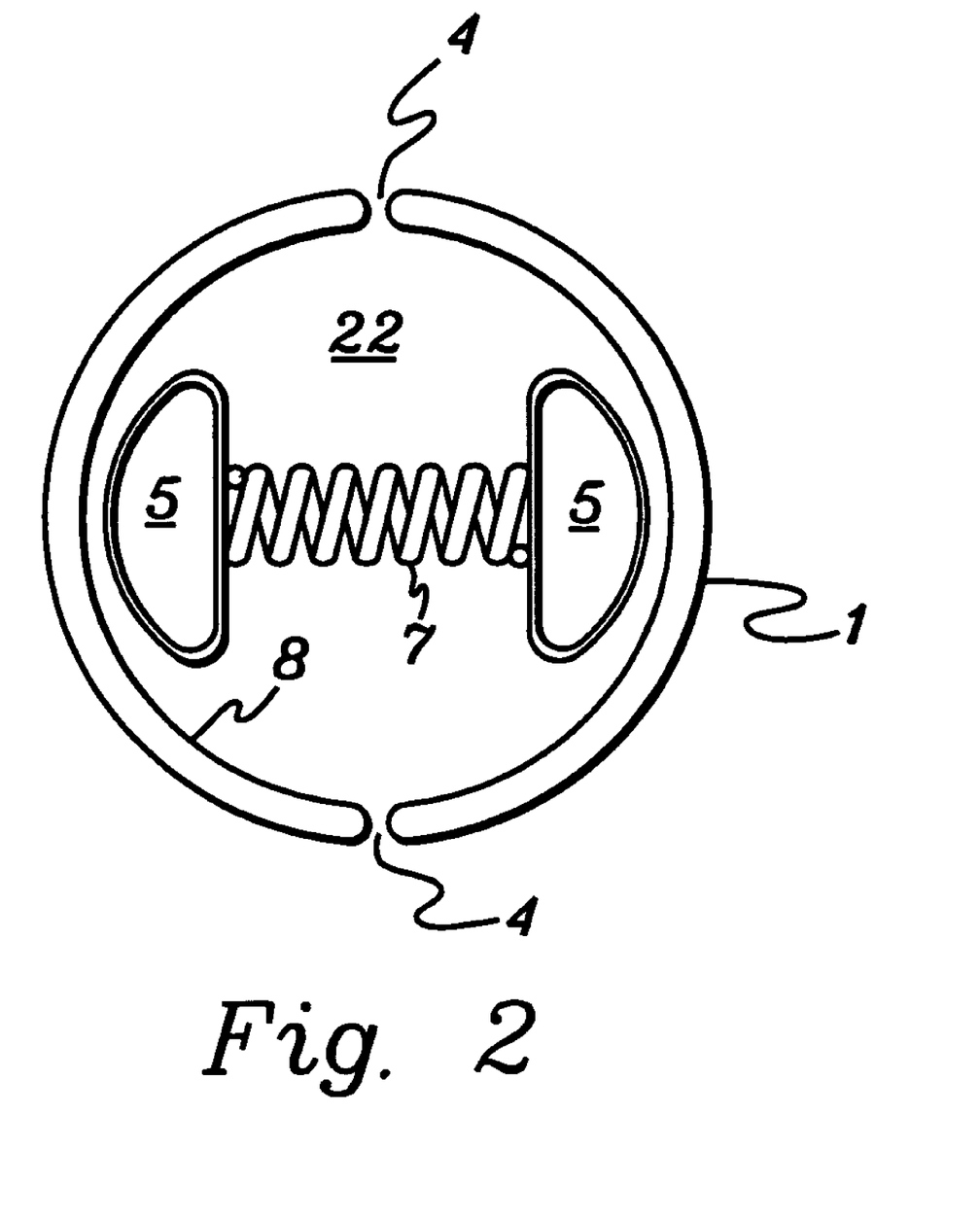
FIG. 2 is a cross-section view through line 2—2 of FIG. 1.

FIG. 2 is a cross-section view through line 2—2 of FIG. 1. The tubular member 5 is a U-tube pre-formed into a "D" configuration, with a radius to match the inner wall 8 of the outer member 1. This "D" arrangement provides room for the springs 7 and the interior space 22 through which the gas 15 (see FIG. 1) flows.

Figure 3:
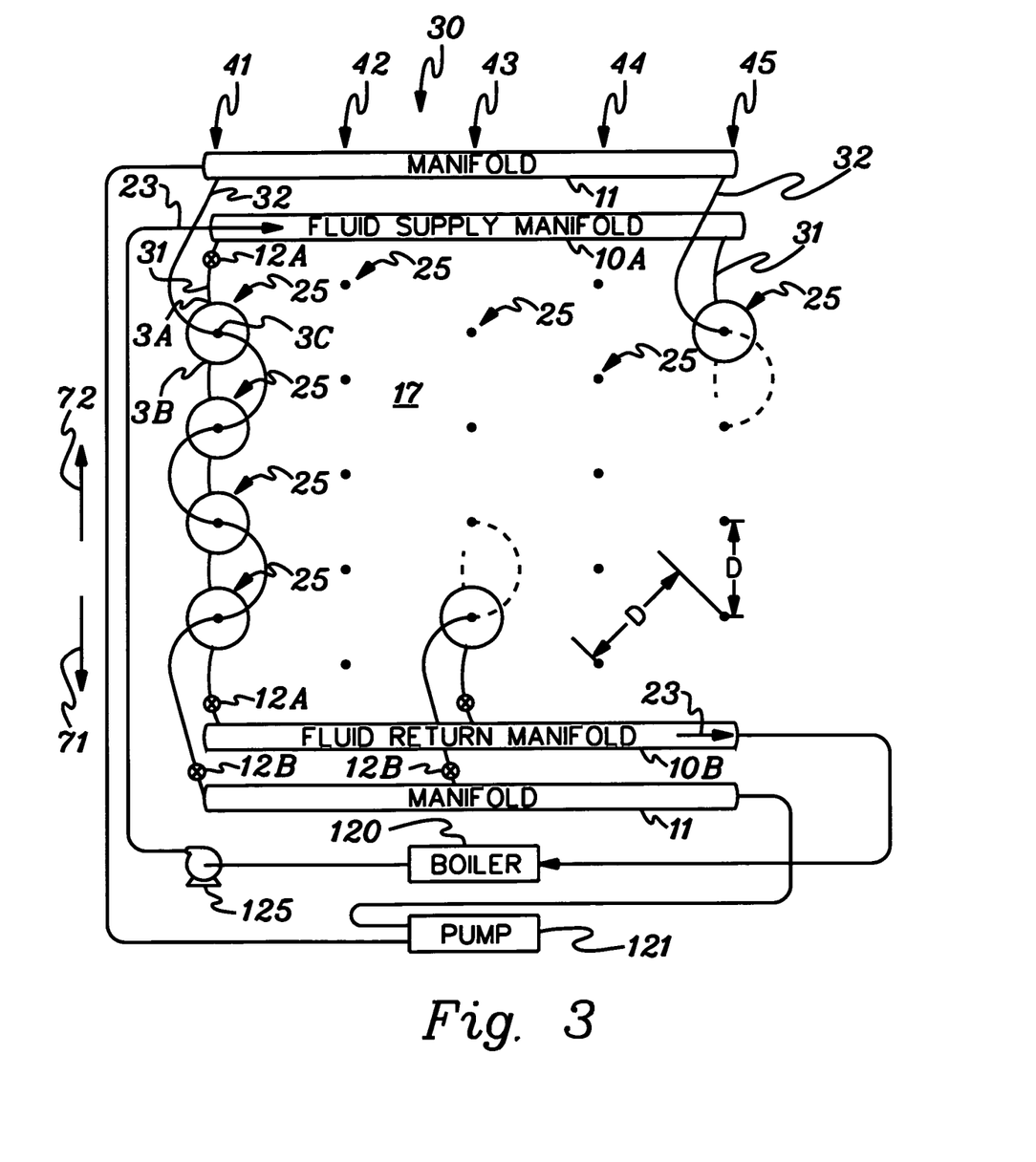
FIG. 3 depicts a soil remediation system for remediating the soil with respect to environmental contamination in the soil, in accordance with embodiments of the present invention.

FIG. 3 depicts a soil remediation system 30 for contaminant gas removal from the soil, in accordance with embodiments of the present invention. The system 30 comprises rows 41-45 of HeatTrode devices 25, a fluid supply manifold 10A, a fluid return manifold 10B, and manifolds 11. The devices 25 in each row of rows 41-45 are serially coupled together with respect to the hot fluid circulation path 31 and the vacuum path 32. In one embodiment, the devices 25 are spatially distributed to have a constant spacing D between devices of each pair of neighboring devices of the same row or between different rows (e.g., D may be 5 feet or less). In one embodiment, the staggered centers of the devices 25 are 3 to 7 feet (e.g., 5 feet apart). In one embodiment, the spacing between two devices 25 may have a variable center-to-center distance between any two neighboring devices 25 (i.e., neighboring devices in a same row or between adjacent rows).

The hot fluid circulation path 31 of each row enables the hot fluid 23 to flow in and out of each device 25 in each row. The hot fluid circulation path 31 of each row is disposed between and coupled to the fluid supply manifold 10A and the fluid return manifold 10B. The hot fluid 23 enters the fluid supply manifold 10A from a heat source (boiler 120) and is distributed by pump 125 into the hot fluid circulation paths 31 for each of rows 41–45. The hot fluid 23 exits from the hot fluid circulation paths 31 of rows 41–45 and merges together in the fluid return manifold 10B at a lower temperature than in the fluid supply manifold 10A due to the heat transferred from the hot fluid 23 in the devices 25 to the adjacent soil 17. The hot fluid 23 in the device 25 is at a higher temperature than the temperature of the adjacent soil 17. The relatively cooler fluid 23 flows out of the fluid return manifold 10B and to the heat source (boiler 120) where the fluid 23 is again heated in preparation for subsequent reentry at the fluid supply manifold 10A, to complete the loop. The fluid supply and return manifolds 10A and 10B, respectively, are open to the hot fluid 23 at opposite ends to help balance flow of the hot fluid 23.

Each row of rows 41–45 includes adjustable valves 12A to control the flow rate of the hot fluid 23 in each row and to balance the flow rate between rows. For example if one row is found to be slightly restrictive to flow because of under sizing or partial blockage, then other rows can be restricted to redirect flow to the needed zone. The valves 12A are also very helpful for trouble shooting, such as leak location. Each row comprises one or two of said valves 12A. If a valve 12A is totally closed in a given row, then the hot fluid 23 will be unable to flow through the devices 25 in the given row.

Figure 4:
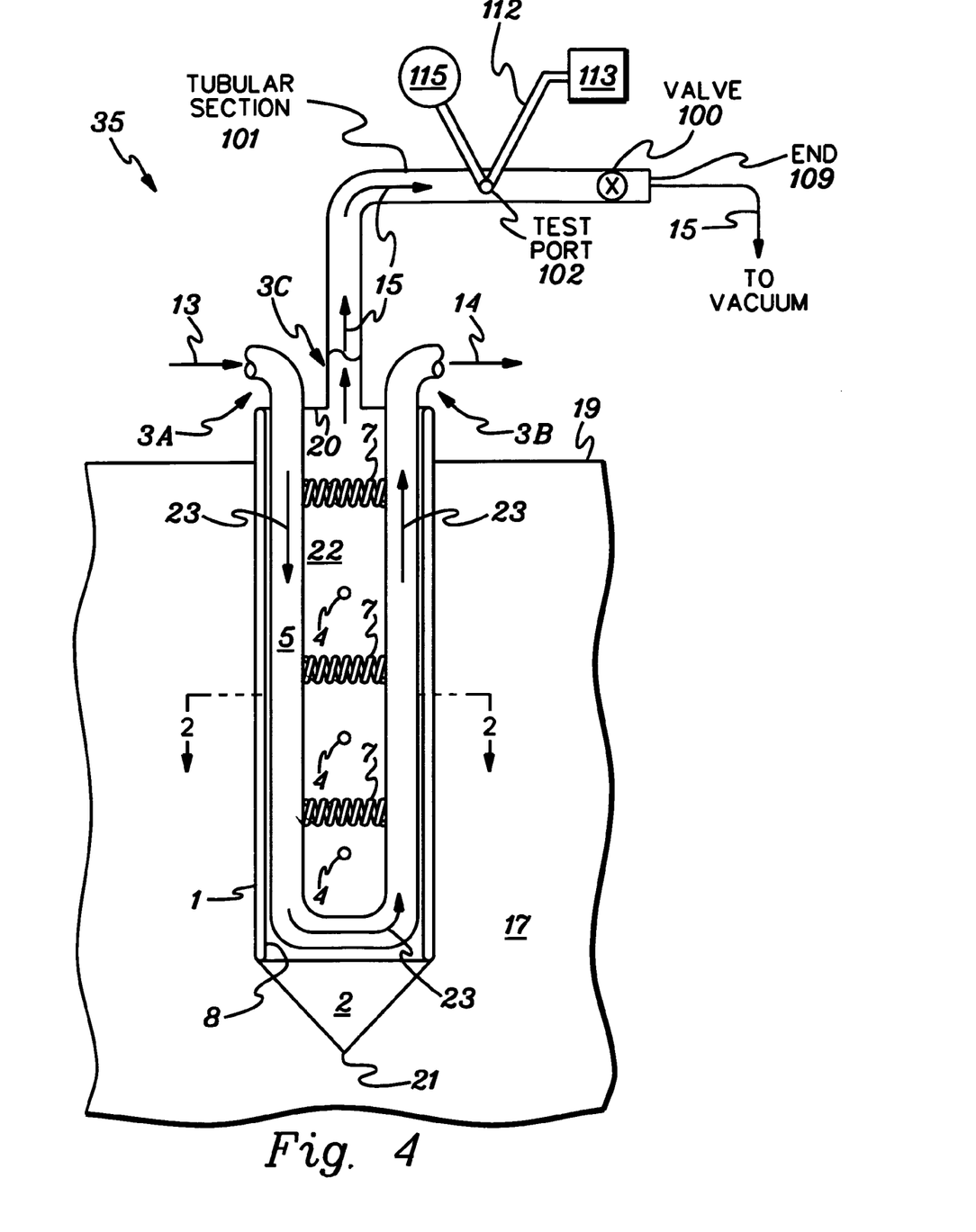
FIG. 4 depicts an alternative soil-remediation device partially into soil of an area of land for remediating the soil in the area with respect to environmental contamination in the soil, in accordance with embodiments of the present invention.

Manifolds 11 operate in the vacuum mode in which a vacuum is created in the vacuum path 32 which passes through the devices 25 in each row via connector 3C (see FIGS. 1 and 4). The vacuum is created by pumping action of a pump 121 operating as a vacuum pump that removes gaseous matter (including gas contaminants removed from the soil 17) from the vacuum path 32 such that the gaseous matter flows between the manifold 11 and the pump 121 in the direction 71. The soil 17 is warmed via the hot fluid 23 in devices 25. Contaminants volatilized by the warming of the soil 17 are extracted from the soil 17 into the interior space 22 of the devices 23 via the vent holes 4 (see FIG. 1) and through the vacuum path 32 and directed to the surface 19 away from the soil 17 for subsequent treatment and/or disposal, rendering the soil 17 clean. The adjustable valves 12B control the flow rate of the volatilized contaminants (i.e., contaiminated gas) in each row and are used balance the flow rate of the volatilized contaminants between rows. If a valve 12B is totally closed in a given row, then the volatilized contaminants will be unable to flow through the devices 25 in the given row. Thus, if a given row has all valves 12A at least partially open with valve 12B for the given row totally closed, then the devices 25 in the given row will facilitate heat transfer to the soil 17 but will not participate in the sucking of contaminant gas from the soil 17. Thus, if the system 30 comprises N devices 25 then contaminant gas may be drawn (i.e. sucked) from M devices of the N devices, wherein M is at least 1 and M does not exceed N. Generally N is at least 3.

In a reverse-mode embodiment, the system 30 could be utilized in a reverse mode wherein a bioremediation fluid (e.g., air, other oxygen-containing gas, oxygen-depriving gas, etc.) is injected into the soil to support biological (e.g., bacterial) activity, wherein the biological activity results in bioremediation of the soil 17 when the soil 17 is heated soil to a temperature sufficient to cause the bioremediation. The heating of the soil to said temperature sufficient to cause said bioremediation is via the devices 25 as described supra. The bioremediation may comprise a biodegration of an environmental contaminant (e.g., VOC, SVOC, non-organic compound, etc.) in the soil 17 to generate a product from the bioremediation. In the reverse-mode embodiment, the pump 121 does not operate as a vacuum pump but rather acts as a pressurizing pump that pumps the bioremediation fluid into the manifold 11, resulting in injection of the bioremediation fluid into the devices 25 and then into the soil via the vent holes 4 (see FIG. 1). The bioremediation fluid forced into the soil 17 interacts with the soil in light of the bioremediation process. For example, bacterial action on the SVOC removes oxygen from the soil 17, and if the bioremediation fluid is an oxygen-containing gas such as air then the oxygen-containing gas replenishes the oxygen that is removed from the soil 17 by the bioremediation process. In the reverse-mode embodiment, the pump 121 pumps the bioremediation fluid to the manifolds 11 in the direction 72.

While FIG. 3 depicts two manifolds 11, the system 30 generally includes a plurality of manifolds 11. While FIG. 3 depicts one pump 121, the system 30 may generally include a single pump 121, or a plurality of such pumps 121 such that each pump 121 is connected to one or more manifolds of the plurality of manifolds 11.

An insulating blanket may cover the area being remediated by the system 30 to minimize thermal loss.

FIG. 4 depicts an alternative HeatTrode device 35 partially inserted into the soil 17 of an area of land for remediating the soil 17 in the area with respect to environmental contamination in the soil, in accordance with embodiments of the present invention. In contrast with the device 25 of FIG. 1, the device 35 of FIG. 4 has a tubular section 101 mechanically connected to the the connector 3C. The tubular section 101 is fluidically coupled to the interior space 22. A first spatial location is said to be fluidically coupled to a second spatial location if a fluid can flow from the first spatial location to the second spatial location and/or flow from the second spatial location to the first spatial location. The tubular section 101 has an end 109 and is coupled to a vacuum at the end 109. The contaminated gas 15 is extracted from the soil 17 by an applied vacuum after the soil 17 has been heated as described supra in conjunction with FIG. 1. The gas 15 flows (by virtue of the vacuum) from the interior space 22 of the device 35 into the tubular section 101 and out through the end 109. In addition, the tubular section 101 may comprise an adjustable valve 100 and/or at least one test port 102.

The adjustable valve 100 is a "throttling means" which, in combination with a suction means (e.g., a vacuum pump), enables the flow of gas 15 to be individually tailored to the specific device 35 comprising the adjustable valve 100, in consideration of soil porosity and concentration of environmental contaminants in the soil local to device 35. Thus, the adjustable valve 100 facilitates balancing the soil remediation system to account for non-uniformity in both soil porosity and system plumbing. Without the adjustable valve 100 (such as in the device 25 of FIG. 1), soil locations of relatively high pore volume delivers more contaminated gas to the vacuum pump, while areas of relatively low pore volume, are essentially under pumped. The over-all effect of the having the adjustable valve 100 is to increase the uniformity of contamination recovery, thus rendering a more uniformly clean site.

The test port 102 is in a bounding wall of the tubular section 101 and is adapted to couple the interior space 22 within the device 35 to an apparatus disposed at least in part outside of the device 35. For example, the test port 102 enables samples of the gas 15 to be extracted and subsequently analyzed by inserting a collection tube 112 in the test port 102, wherein the collection tube 112 transports the sample to an external location 113 where the sample may be analyzed such as for concentration of each gaseous species of the gas 15 in the extracted sample. As another example, the test port 102 enables the flowing gas 15 to be tested for a characteristic of the gas 15 by inserting a measuring instrument 115 (e.g., anemometer, moisture meter, flow meter, pressure gauge thermostat, etc.) for measuring the characteristic. In one embodiment, the measuring instrument 115 may be a portable measuring instrument. The characteristic may be, inter alia, at least one of the velocity, flow rate (e.g., volumetric flow rate, mass flow rate, etc.), pressure, temperature, etc. In one embodiment, the measuring instrument 115 may be coupled to an electronic apparatus, such as the electronic apparatus of FIG. 7 (described infra), so that the measured data obtained by the measuring instrument 115 may be analyzed and utilized for performing control functions on the device 35 as explained infra in conjunction with FIG. 7

Figure 5:
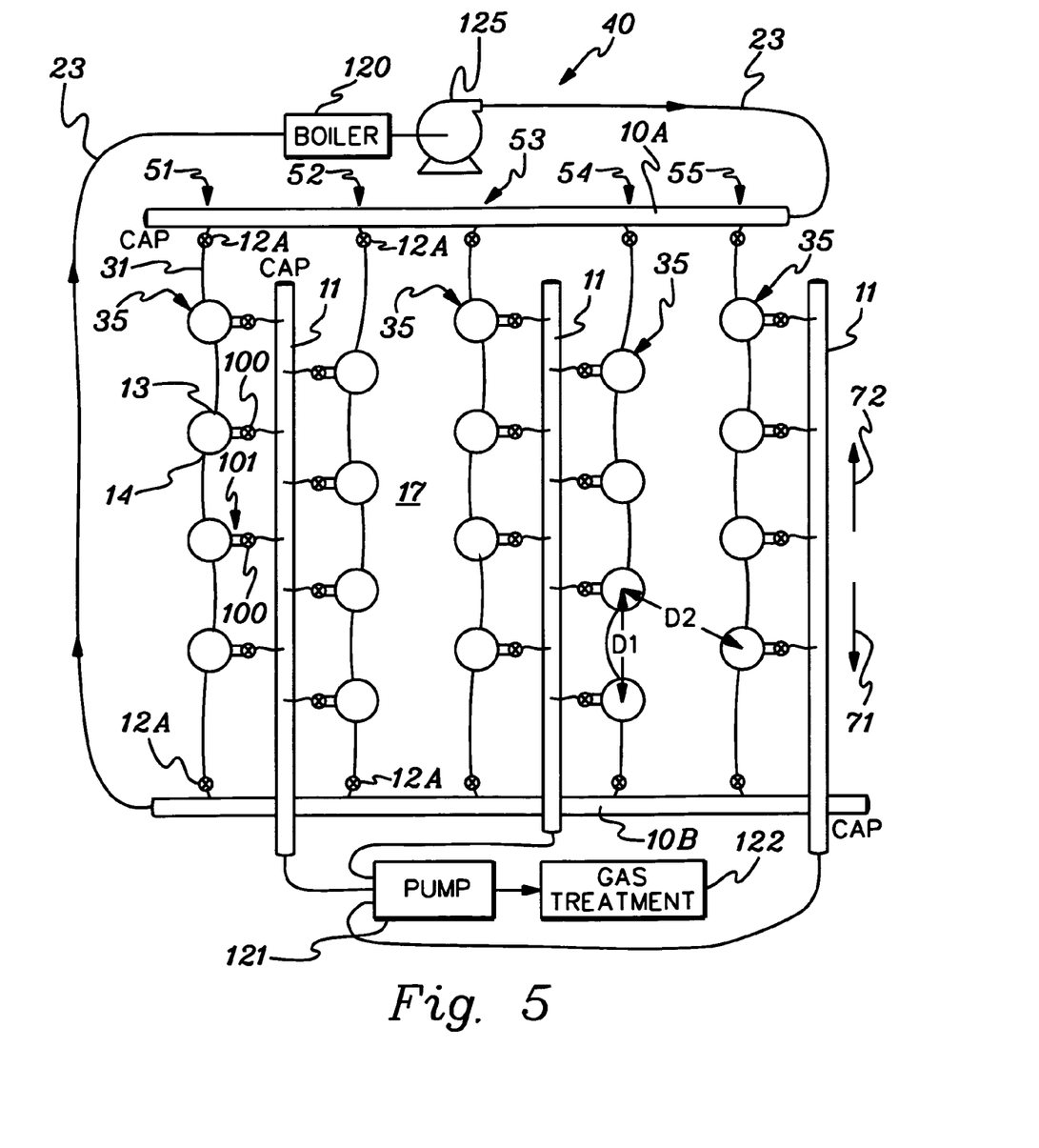
FIG. 5 depicts an alternative soil remediation system for remediating the soil with respect to environmental contamination in the soil, in accordance with embodiments of the present invention.

FIG. 5 depicts an alternative soil remediation system 40 for contaminant gas removal, in accordance with embodiments of the present invention. Systems 40 and 30 of FIGS. 5 and 3, respectively, have substantially the same hot fluid circulation loop, but different vacuum loop configurations. Rows 51–55 in FIG. 5 differ from rows 41–45 in FIG. 3 in that rows 51–55 comprise the devices 35 of FIG. 4, whereas rows 41–45 of FIG. 3 comprise the devices 25 of FIG. 1.

In the hot fluid circulation loop of FIG. 5, a heat source (boiler 120) heats the hot fluid 23 followed by pumping of the hot fluid 23 by pump 125 to cause entry of the hot fluid 23 into the fluid supply manifold 10A from which the hot fluid 23 flows in parallel into rows 51–55 through the devices 35 arranged in series in each row. After flowing through rows 51–55, the hot fluid 23 enters the fluid return manifold 10B followed by return to the boiler 120 to complete the loop. The same hot fluid circulation loop exists in the system 30 of FIG. 3.

In FIG. 5, the vacuum pump 121 pumps gaseous matter out of the manifolds 11 such that the contaminant gas is pulled out of the soil 17, into the devices 35, and ultimately away from the soil 17 such as to a gas treatment facility 122. The devices 35 in each pair of adjacent rows are coupled to a single manifold 11 for drawing the contaminant gas out of the soil and into said manifold. Each device 35 has an adjustable valve 100 to enable the flow rate of contaminant gas from the soil to be individually tailored to the soil conditions local to each device 35. The devices 35 in each row have a separation distance D1 and the devices 35 in adjacent rows have a separation distance D2, wherein D1 may be equal to or unequal to D2. Generally, the separation distance be any two neighboring devices may vary according to any specified criteria.

The soil 17 is warmed via the hot fluid 23 in devices 35. Contaminates volatilized by the warming of the soil 17 are extracted from the soil 17 into the interior space 22 of the devices 35 via the vent holes 4 (see FIG. 4) and into the manifolds 11. The adjustable valves 100 control the flow rate of the volatilized contaminants (i.e., contaminated gas) in each device 35 and are used balance the flow rate of the volatilized contaminants among devices 35. If a valve 100 is totally closed for a given device 35, then the volatilized contaminants will be unable to flow through the given device 35. Thus, if a given row has all valves 12A at least partially open and valve 100 totally closed for a specified device 35 in the given row, then the specified device 35 in the given row will facilitate heat transfer to the soil 17 but will not participate in the sucking of contaminant gas from the soil 17. Thus, if the system 40 comprises N devices 35 then contaminant gas may be drawn (i.e. sucked) from M devices of the N devices, wherein M is at least 1 and M does not exceed N. Generally N is at least 3. Either, both, or neither of the adjustable valve 100 and test port 102 may comprised by the tubular section 101. Thus if the M devices 35 have the adjustable valve 100, then K devices of the M devices may comprise the test port 102, wherein K is at least 1 and no greater than M.

To balance the system 40, all valves are first opened and vacuum is applied. A "hot wire anemometer" is inserted into each test port 102 and air velocities are recorded. Knowing the inside diameter of tubular section 101, flow rates (e.g., volumetric or mass flow rates) are calculated. Then each valve 100 is throttled so that the flow rates of all flows out of each device 35 are approximately equal. Test port 102 may also be used to extract gas samples. For example, a syringe can withdraw gas while the system is operational to assess the level of contaminate concentration out of each device 35. Data from both flow (e.g., volumetric and/or mass flow rate) and concentration can be plotted spatially to provide a immediate site assessment to determine remediation performance. Flow and concentration can be plotted separately or as a product to illustrate mass removal rate. Additionally, the valve 100 can be closed and a pressure gage can be used to measure vacuum influence from adjacent devices 35, which may be used to confirm that all soil being processed experiences a vacuum gradient which creates contaminant gas flow, thus removing contaminates. Zero vacuum indicates a dead area which would not remediate.

In a reverse-mode embodiment, the system 40 could be utilized in a reverse mode wherein a bioremediation fluid (e.g., air, other oxygen-containing gas, oxygen-depriving gas, etc.) is injected into the soil to support biological (e.g., bacterial) activity, wherein the biological activity results in bioremediation of the soil 17 when the soil 17 is heated soil to a temperature sufficient to cause the bioremediation. The heating of the soil to said temperature sufficient to cause said bioremediation is via the devices 35 as described supra. The bioremediation may comprise a biodegration of an environmental contaminant (e.g., VOC, SVOC, non-organic compound, etc.) in the soil 17 to generate a product from the bioremediation. In the reverse-mode embodiment, the pump 121 does not operate as a vacuum pump but rather acts as a pressurizing pump that pumps the bioremediation fluid into the manifolds 11, resulting in injection of the bioremediation fluid into the devices 35 and then into the soil via the vent holes 4 (see FIG. 1). The bioremediation fluid forced into the soil 17 interacts with the soil in light of the bioremediation process. For example, bacterial action on the SVOC removes oxygen from the soil 17, and if the bioremediation fluid is an oxygen-containing gas such as air then the oxygen-containing gas replenishes the oxygen that is removed from the soil 17 by the bioremediation process. In the reverse-mode embodiment, the pump 121 pumps the bioremediation fluid to the manifolds 11 in the direction 72.

While FIG. 5 depicts three manifolds 11, the system 40 generally includes a plurality of manifolds 11. While FIG. 5 depicts one pump 121, the the system 40 may generally include a single pump 121, or a plurality of such pumps 121 such that each pump 121 is connected to one or more manifolds of the plurality of manifolds 11.

An insulating blanket may cover the area being remediated by the system 40 to minimize thermal loss.

Figure 6:
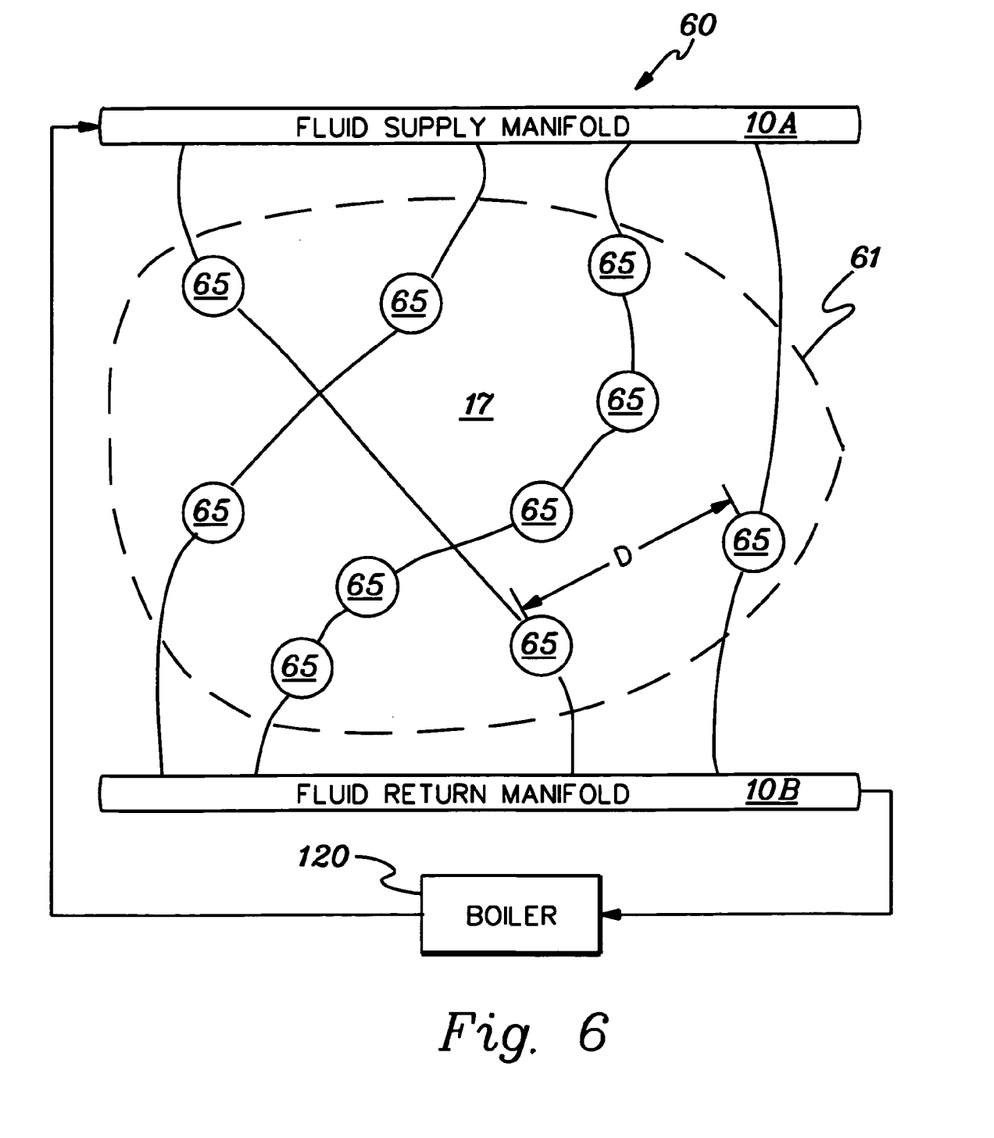
FIG. 6 depicts a portion of a soil remediation system for remediating the soil with respect to environmental contamination in the soil, in accordance with embodiments of the present invention.

FIG. 6 depicts a portion of a soil remediation system 60 for remediating the soil 17 with respect to environmental contamination in the soil, in accordance with embodiments of the present invention. The system 60 of FIG. 6 provides a more general spatial distribution of the soil-remediation devices and of the serial coupling of the devices between the fluid supply and return manifolds for transferring heat to the soil, than does the systems 30 and 40 of FIGS. 3 and 5, respectively. Soil-remediation devices 65 represent either the devices 25 of FIG. 3 or the devices 35 of FIG. 5.

For simplicity of illustration in FIG. 6, the gas distribution system with the pump 121 and the manifolds 11 operating in either the vacuum mode or the reverse-mode embodiment are not shown in FIG. 6 but are assumed to exist in the system 60 in accordance with the description supra of the gas distribution system of the systems 30 and 40 of FIGS. 3 and 5, respectively. As in the systems 30 and 40 of FIGS. 3 and 5, respectively, if the system 60 of FIG. 6 comprises N devices 65 then contaminant gas may be drawn (i.e. sucked) from M devices of the N devices, wherein M is at least 1 and M does not exceed N. Generally N is at least 3. Either, both, or neither of the adjustable valve 100 and test port 102 may comprised by the tubular section 101. Thus if the M devices 65 have the adjustable valve 100, then K devices of the M devices may comprise the test port 102, wherein K is at least 1 and no greater than M.

The system 60 comprises the soil-remediation devices 65 partially inserted in the soil 17 of an area (A) bounded by the contour 61. Each device 65 is directly and fluidically connected: between two other devices 65, between another device 65 and the fluid supply manifold 10A, between another device 65 and the fluid return manifold 10B, or between the fluid supply manifold 10A and the fluid return manifold 10B.

The devices 65 may be distributed within the area A, in consideration of the serial fluid connections between the fluid supply manifold 10A and the fluid return manifold 10B, such that the heat transferred from the N devices to the soil 17 generates a spatial distribution of temperature in the area A that matches a specified spatial distribution of temperature in the area A to within a specified tolerance. For example, the specified spatial distribution of temperature in the area A may be, inter alia, a spatially uniform temperature distribution in the area A. The tolerance may be such that at the temperature at each spatial location in the area not deviate from the spatially uniform temperature by, inter alia, more than 10 degrees Fahrenheit. In one embodiment, each pair of neighboring devices 65 has about a same inter-device separation distance D. In other embodiments, the spatial distribution of the devices 65 in the area A may be as described supra for the devices 25 and 35 of systems 30 and 40 of FIGS. 3 and 5, respectively.

Figure 7:
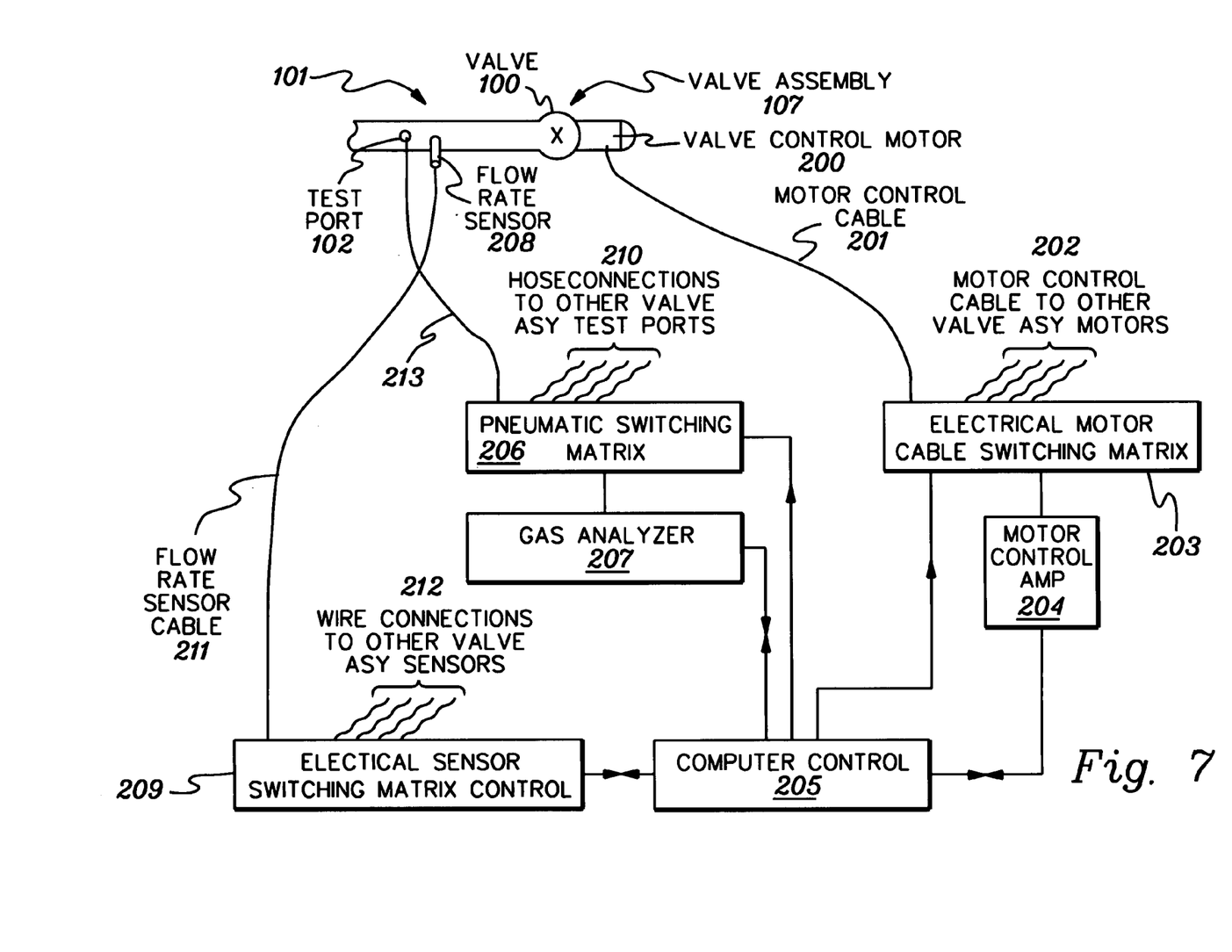
FIG. 7 is a block diagram depicting automation of gas flow rate control and gas sampling for the devices of the soil remediation system of FIGS. 5 and 6, in accordance with embodiments of the present invention.

FIG. 7 is a block diagram depicting automation of gas flow rate control and gas sampling for the devices 35 and 65 of the soil remediation system 40 and 60 of FIGS. 5 and 6, respectively, in accordance with embodiments of the present invention. In FIG. 7, a valve assembly 107 is shown with test port 102 and adjustable valve 100. A valve control motor 200 is employed for remote control and sensing of valve 100 position. Motor control cables 201 are combined with additional motor control cables 202 and switched via a switching matrix 203 to a single motor control amp 204. The computer control 205 can select a single valve control motor 200 (from the multiple valves 100 associated with corresponding devices 35) for manipulation. One by one, the computer control 205 will address the switching matrix 203 and control each valve control motor 200 of its associated valve 100.

A flow rate sensor 208 is shown on the valve assembly 107 in a secondary test port with flow rate sensor cable 211. Each of the numerous flow sensors are connected to a switching matrix 209 which is controlled by the computer control 205. The computer control 205 addresses the switching matrix 209, selecting one sensor at a time to examine vacuum flow rate through valve assembly 107. One by one the computer control 205 checks the flow rate through the numerous valve assemblies.

Also shown is a sensor hose 213 connected to valve assembly 107. The hose 213 connects from test port 102 to a pneumatic switching matrix 206. Also connected to the pneumatic switching matrix 206 are numerous additional hoses from other valve assemblies. The computer control 205 can address the pneumatic switching matrix 206 and select a single hose to feed gas analyzer 207. The output signal from the analyzer is fed to the computer control 205. One by one, the computer control 205 can examine the level of contamination at each valve assembly 107.

The automated system of FIG. 7 has the capability of sensing and adjusting flow of "off gas" contaminates from each device 35 to achieve optimal balance and uniformity of remediation. Balance can be further tailored based on production of contaminants due to the ability to remotely sense flow contaminate concentration at each device 35.

Thus, the automated system of FIG. 7 comprises flow management means for electronically processing the measured characteristic (e.g., flow rate) of the generated gas in each device 35 of the system 40 of FIG. 5 (or of the generated gas in each device 65 of the system 60 of FIG. 6) for electronically controlling the throttling means (i.e., valves 100) to simultaneously redistribute the flow rate in the devices, responsive to the processed measured characteristic and in accordance with a specified flow rate distribution rule. The flow distribution rule may dictate, inter alia, that the redistributed flow rates in the devices are to be adjusted to be about equal to each other within a specified flow rate tolerance. Said electronically processing and said electronically controlling may be utilized via computer control 205 implemented through, inter alia, execution of computer readable program code on a processor of a computer system such as the computer system 90 of FIG. 8 (described infra).

Furthermore, the automated system of FIG. 7 comprises extraction means (e.g., gas analyzer 207) for independently extracting a sample of the gas from each device in combination with measuring means for measuring a characteristic of the generated gas in the sample extracted from each device of the K devices. For example, the characteristic of the gas in the sample extracted from each device may be a concentration of each gaseous species of the gas in the sample extracted from each device. In addition, extraction management means (as described supra in conjunction with FIG. 7) may be employed for electronically controlling the extraction means to perform said extracting. Said electronically controlling the extraction means may be utilized via computer control 205 implemented through, inter alia, execution of computer readable program code on a processor of a computer system such as the computer system 90 of FIG. 8 (described infra).

Figure 8:
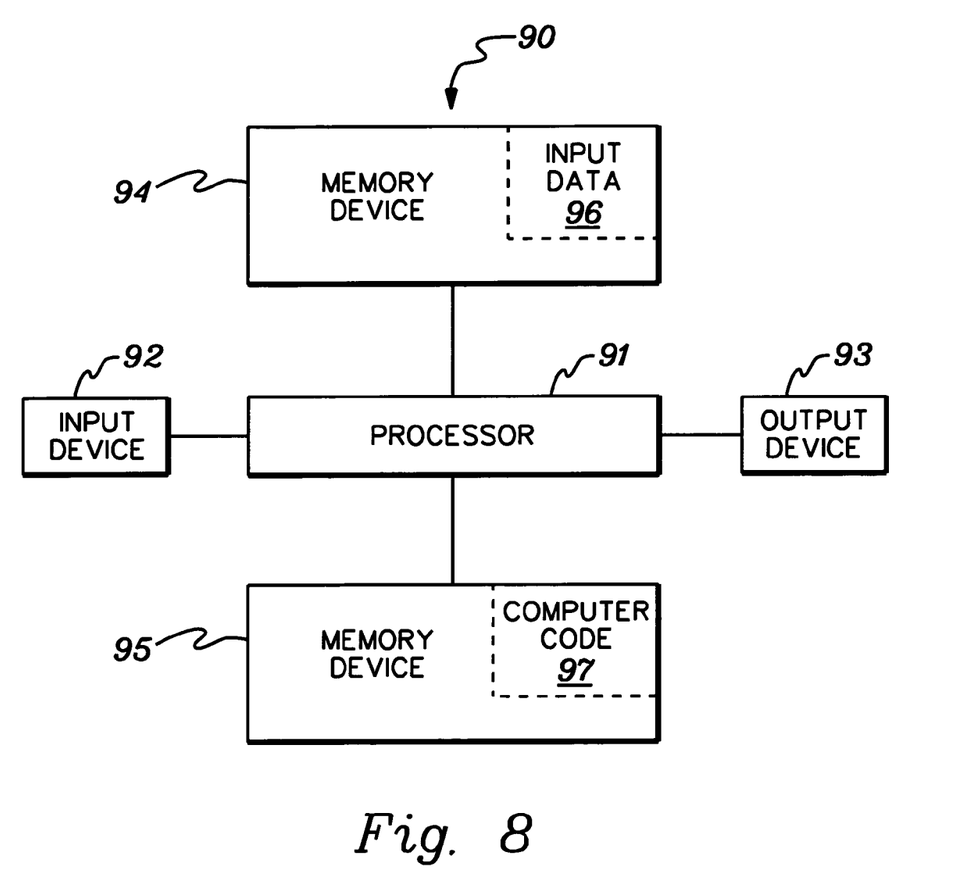
FIG. 8 illustrates a computer system used for controlling and analyzing the remediation of soil of an area of land with respect to environmental contamination in the soil, in accordance with embodiments of the present invention.

FIG. 8 illustrates a computer system 90 used for controlling and analyzing the remediation of soil of an area of land with respect to environmental contamination in the soil, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, device or circuit for receiving analog or digital data (e.g., connections to the computer control 205 of FIG. 7), etc. The output device 93 may be, inter alia, a printer, a plotter, a computer screen, a magnetic tape, a removable hard disk, a floppy disk, device or circuit for supplying analog or digital data (e.g., connections from the computer control 205 of FIG. 7), etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for controlling and analyzing the remediation of soil of an area of land with respect to environmental contamination in the soil. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for controlling and analyzing the remediation of soil of an area of land with respect to environmental contamination in the soil.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A soil-remediation device for remediating soil of an area of land, said device comprising:

an outer member that includes an outer surface of the device, wherein the outer member comprises a first thermally conductive material;

a tubular member through which a fluid may be circulated in and out of the device such that if the device is in contact with the soil then heat is transferred from the fluid to the soil by being transferred from the fluid to the tubular member, from the tubular member to the outer member, and from the outer member to the soil, wherein the fluid in the tubular member is at a higher temperature than is the soil in contact with the device, wherein the tubular member comprises a second thermally conductive material, and wherein the outer member surrounds the tubular member;

a plurality of springs within an interior space of the device such that the plurality of springs applies a force to the tubular member to facilitate direct physical and thermal contact between the tubular member and the outer member, wherein the tubular member surrounds the interior space and the plurality of springs; and a plurality of vent holes in the outer member, such that if the device is in contact with the soil then a gas may flow through the vent holes from the soil to the interior space or from the interior space to the soil.

2. The device of claim 1, wherein the device is partially inserted into the soil.

3. The device of claim 1, wherein the device further comprises a tubular section mechanically connected to an external part of the outer member, wherein the tubular section is fluidically coupled to the interior space, and wherein the tubular member comprises an adjustable valve for adjusting a flow rate of the gas in or out of the device.

4. The device of claim 3, wherein a bounding wall of the tubular section comprises a test port adapted to couple the interior space within the device to an apparatus disposed at least in part outside of the device, wherein the apparatus is adapted to extract a sample of the gas in the interior space, measure a characteristic of the gas in the interior space, or a combination thereof.

5. A method of forming the soil-remediation device of claim 1, said method comprising coupling together the outer member, the tubular member, and the plurality of springs to form the device.

6. A system for remediating soil of an area of land, said system comprising:

N soil-remediation devices partially inserted into the soil of the area, said N being at least 3, each device of the N devices comprising two or more vent holes for fluidically coupling each device of the N devices to the soil;

circulation means for circulating a hot fluid in and out of each device of the N devices to transfer heat from the hot fluid to the soil, the heat passing from a hot fluid supply manifold to the N devices and then to a hot fluid return manifold, the hot fluid in the fluid supply manifold having a higher temperature than the hot fluid in the return manifold, the hot fluid in each device of the N devices having a higher temperature than a temperature of the soil in contact with each device, the heat transferred from the N devices to the soil which heats the soil to a temperature sufficient to cause a transformation of an environmental contaminant in the soil such that a gas is generated from the transformation; and suction means for sucking the gas from the soil into M devices of the N devices via the vent holes of the M devices and out of the M devices away from the soil, said M at least 1 and no greater than N, wherein each device of the N devices consists of the device of claim 1, and wherein the two or more vent holes consist of the plurality of vent holes in each device.

7. The system of claim 6, wherein M=N, wherein the hot fluid consists essentially of water, wherein the N devices are configured as at least two sets of devices, wherein each set of the least two sets includes at least two devices of the N devices serially distributed between the fluid supply manifold and the fluid return manifold, wherein the hot fluid does not directly flow from any device in any set of the least two sets to a device in any other set of the least two sets.

8. The system of claim 6, wherein each device of the N devices is directly and fluidically connected: between two other devices of the N devices, between another device of the N devices and a fluid manifold selected from the group consisting of the fluid supply manifold and the fluid return manifold, or between the fluid supply manifold and the fluid return manifold.

9. The system of claim 8, wherein the N devices are distributed within the area such that the heat transferred from the N devices to the soil generates a spatial distribution of temperature in the area that matches a specified spatial distribution of temperature in the area to within a specified tolerance.

10. The system of claim 9, wherein the specified spatial distribution of temperature in the area is a spatially uniform temperature.

11. The system of claim 8, wherein the suction means comprises at least one pump connected to at least one vacuum manifold, wherein the M devices are fluidically coupled to the at least one vacuum manifold such that operation of the at least one pump draws the gas: from the soil into the M devices, from the M devices into the at least one vacuum manifold, and from the at least one vacuum manifold away from the soil.

12. The system of claim 11, wherein the system further comprises measuring means for independently measuring a characteristic of the gas in each device of K devices of the M devices, and wherein K is at least 1 and no greater than M.

13. The system of claim 12, wherein the system further comprises throttling means for independently controlling a flow rate of the gas in each device of the K devices, and wherein the flow rate is a volumetric flow rate or a mass flow rate.

14. The system of claim 13, wherein K is at least 2, wherein the system further comprises flow management means for electronically processing the measured characteristic of the generated gas in each device of the K devices and for electronically controlling the throttling means to simultaneously redistribute the flow rate in the K devices, responsive to the processed measured characteristic and in accordance with a specified flow rate distribution rule.

15. The system of claim 12, wherein the system further comprises extraction means for independently extracting a sample of the gas from each device of the K devices, and wherein the measuring means comprise means for measuring the characteristic of the generated gas in the sample extracted from each device of the K devices.

16. The system of claim 15, wherein K is at least 2, wherein the system further comprises extraction management means for electronically controlling the extraction means to perform said extracting.

17. The system of claim 12, wherein K=M.

18. The system of claim 6, wherein M=N.

19. A method for remediating soil of an area of land, said method comprising:

providing the system of claim 6;

circulating the hot fluid in and out of each device of the N devices to transfer heat from the hot fluid to the soil, the heat passing from the fluid supply manifold to the N devices and then to the fluid return manifold, the hot fluid in the fluid supply manifold having the higher temperature than the hot fluid in the return manifold, the hot fluid in each device of the N devices having the higher temperature than the temperature of the soil in contact with each device, the heat transferred from the N devices to the soil which heats the soil to the temperature sufficient to cause the transformation of the environmental contaminant in the soil such that the gas is generated from the transformation; and drawing the gas from the soil into the M devices of the N devices via the vent holes of the M devices and out of the M devices away from the soil through creation of the lower partial pressure of the gas in each device of the M devices than the partial pressure of the gas in the soil.

20. A system for remediating soil of an area of land, said system comprising

N soil-remediation devices partially inserted into the soil of the area, said N being at least 3, each device of the N devices comprising two or more vent holes for fluidically coupling each device of the N devices to the soil;

circulation means for circulating a hot fluid in and out of each device of the N devices to transfer heat from the hot fluid to the soil, the heat passing from a fluid supply manifold to the N devices and then to a fluid return manifold, the hot fluid in the fluid supply manifold having a higher temperature than the fluid in the return manifold, the hot fluid in each device of the N devices having a higher temperature than a temperature of the soil in contact with each device, the heat transferred from the N devices to the soil which heats the soil to a temperature sufficient to cause a bioremediation of an environmental contaminant in the soil such that a product is generated from the bioremediation; and injection means being means for injecting a bioremediation fluid into M devices of the N devices such that the bioremediation fluid flows from the M devices to the soil via the vent holes of the M devices to facilitate the bioremediation, said M being at least 1 and no greater than N, wherein each device of the N devices consists of the device of claim 1, and wherein the two or more vent holes consist of the plurality of vent holes in each device.

21. The system of claim 20, wherein M=N, wherein the hot fluid consists essentially of water, wherein the N devices are configured as at least two sets of devices, wherein each set of the least two sets includes at least two devices of the N devices serially distributed between the fluid supply manifold and the fluid return manifold, wherein the hot fluid does not directly flow from any device in any set of the least two sets to a device in any other set of the least two sets.

22. The system of claim 20, wherein each device of the N devices is directly and fluidically connected: between two other devices of the N devices, between another device of the N devices and a fluid manifold selected from the group consisting of the fluid supply manifold and the fluid return manifold, or between the fluid supply manifold and the fluid return manifold.

23. The system of claim 22, wherein the N devices are distributed within the area such that the heat transferred from the N devices to the soil generates a spatial distribution of temperature in the area that matches a specified spatial distribution of temperature in the area to within a specified tolerance.

24. The system of claim 23, wherein the specified spatial distribution of temperature in the area is a spatially uniform temperature.

25. The system of claim 22, wherein the injection means comprises at least one pump connected to at least one injection manifold, wherein the M devices are fluidically coupled to the at least one injection manifold such that operation of the at least one pump injects the bioremediation fluid: from the at least one injection manifold into the M devices and from the M devices into the soil.

26. A method for remediating soil of an area of land, said method comprising:

providing the system of claim 20;

circulating the hot fluid in and out of each device of the N devices to transfer heat from the hot fluid to the soil, the heat passing from the fluid supply manifold to the N devices and then to the fluid return manifold, the hot fluid in the fluid supply manifold having the higher temperature than the hot fluid in the return manifold, the hot fluid in each device of the N devices having the higher temperature than the temperature of the soil in contact with each device, the heat transferred from the N devices to the soil which heats the soil to the temperature sufficient to cause the bioremediation of the environmental contaminant in the soil such that the product is generated from the bioremediation; and injecting the bioremediation fluid into the M devices of the N devices such that the bioremediation fluid flows from the M devices to the soil via the vent holes of the M devices to facilitate the bioremediation.

27. A method for remediating soil of an area of land, said method comprising:

partially inserting the device of claim 1 into the soil of the area;

circulating hot fluid in and out of the device to heat the soil to a temperature sufficient to cause a transformation of an environmental contaminant in the soil such that a gas is generated from the transformation; and drawing the gas from the soil into the device via the vent holes of the device and out of the device away from the soil through creation of a lower partial pressure of the gas in each device than a partial pressure of the gas in the soil.

28. A method for remediating soil of an area of land, said method comprising:

partially inserting the device of claim 1 into the soil of the area;

circulating a hot fluid in and out of the device to heat the soil to a temperature sufficient to cause a bioremediation of an environmental contaminant in the soil such that a product is generated from the bioremediation; and injecting a bioremediation fluid into the device such that the bioremediation fluid flows from the device to the soil via the vent holes of the device to facilitate the bioremediation.

* * * * *

UNITED STATES PATENT AND TRADEMARK OFFICE
CERTIFICATE OF CORRECTION

PATENT NO. : 7,175,366 B2 Page 1 of 1
APPLICATION NO. : 11/262281
DATED : February 13, 2007
INVENTOR(S) : Geisel It is certified that error appears in the above-identified patent and that said Letters Patent is hereby corrected as shown below:

Column 1
Line 23, delete "a" and insert -- as --

Column 5
Line 25, delete "have" and insert -- having --

Column 6
Line 52, delete "used balance" and insert -- used to balance --

Column 9
Line 32, delete "a" and insert -- an --

Column 10
Line 3, delete "the the" and insert -- the --
Line 30, delete "may" and insert -- may be --

Signed and Sealed this

Seventeenth Day of April, 2007

JON W. DUDAS
*Director of the United States Patent and Trademark Office*